(12) United States Patent
Gupta et al.

(10) Patent No.: US 8,283,424 B2
(45) Date of Patent: Oct. 9, 2012

(54) PROCESS FOR THE SYNTHESIS OF ALPHA-OLEFIN POLYMERIZATION PROCATALYSTS

(75) Inventors: Virendrakumar Gupta, Maharashtra (IN); Harshad Ramdas Patil, Maharashtra (IN); Dhananjay Ghelabhai Naik, Maharashtra (IN)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 12/933,370

(22) PCT Filed: Aug. 25, 2008

(86) PCT No.: PCT/IN2008/000533
§ 371 (c)(1),
(2), (4) Date: Sep. 17, 2010

(87) PCT Pub. No.: WO2009/116057
PCT Pub. Date: Sep. 24, 2009

(65) Prior Publication Data
US 2011/0015355 A1    Jan. 20, 2011

(30) Foreign Application Priority Data
Mar. 18, 2008  (IN) .......................... 541/MUM/2008

(51) Int. Cl.
*C08F 4/44* (2006.01)
*C08F 4/72* (2006.01)
*B32B 5/16* (2006.01)
*C07C 31/30* (2006.01)
*C07F 7/00* (2006.01)
*B01J 31/00* (2006.01)
*B01J 37/00* (2006.01)

(52) U.S. Cl. ...................... 526/123.1; 526/108; 428/402; 568/851; 556/51; 502/171; 502/104; 502/103

(58) Field of Classification Search ............... 526/123.1, 526/108; 428/402; 568/851; 556/51; 502/171, 502/104, 103
See application file for complete search history.

(56) References Cited

U.S. PATENT DOCUMENTS

| 4,683,215 A | 7/1987 | Bilhou et al. |
| 2003/0064882 A1* | 4/2003 | Kilty et al. ................... 502/103 |
| 2005/0003952 A1 | 1/2005 | Fottinger et al. |
| 2011/0054129 A1* | 3/2011 | Gupta et al. ............... 526/123.1 |

OTHER PUBLICATIONS

International Search Report dated Dec. 3, 2009 for related International Application No. PCT/IN2008/000533.

* cited by examiner

*Primary Examiner* — William Cheung
(74) *Attorney, Agent, or Firm* — Klein, O'Neill & Singh, LLP

(57) ABSTRACT

The invention relates to a process for the synthesis of a Ziegler Natta procatalyst, the process comprising first treating magnesium alkoxide with a twice used mixed solvent of $TiCl_4$ and chlorobenzene to form a first stage product, then treating the first stage product with a once used mixed solvent of $TiCl_4$ and chlorobenzene to form a second stage product and finally treating the second stage product with mixed solvent recovered by treatment of effluent from the first treatment with benzoyl chloride so as to convert contaminant of formula $TiCl_3OR$ in the effluent to an addition complex which is precipitated, filtered off and hydrolyzed to recover ethyl benzoate and to form $Ti(OH)_4$ as a side product, the product after final treatment being subjected to a plurality of successive washing steps with used as well as recovered hexane.

6 Claims, No Drawings

US 8,283,424 B2

PROCESS FOR THE SYNTHESIS OF ALPHA-OLEFIN POLYMERIZATION PROCATALYSTS

FIELD OF INVENTION

The invention relates to a process for synthesis of a Ziegler Natta procatalyst, used in the polymerization of alpha olefins, involving multistage treatment of magnesium alkoxide with used as well as recovered mixture of titanium tetrachloride and chlorobenzene (mixed solvent) and successive washing of the product with used as well as recovered hexane. The invention also relates to the procatalyst synthesized by the process and to the polymerization process using the procatalyst.

BACKGROUND OF THE INVENTION

Ziegler Natta type catalysts used for polymerization of alpha-olefin usually involve a procatalyst comprising titanium, magnesium, chlorine, an internal donor and a cocatalyst which is essentially an organo aluminium compound. The performance of such catalysts is further complemented by the usage of an external electron donor.

The procatalysts are usually synthesised by contacting magnesium alkoxide with a mixed solvent (a mixture of $TiCl_4$ and chlorobenzene) in the presence of an internal donor, in multiple stages, adding fresh $TiCl_4$ during each stage. During such synthesis, a compound of the formula $TiCl_3OR$ (where R is an alkyl or aryl group) is formed along with solid product. $TiCl_3OR$ remain dissolved in the mixed solvent as a contaminant. Such contaminated solvents raise waste disposal issues and therefore the contaminant need to be eliminated. The contaminants in the solvents are most commonly removed by distillation process. The process of distillation is, however, energy intensive, require elaborate equipments and the distillation by itself generate hazardous wastes. U.S. Pat. No. 4,683,215 describes a process for synthesis of Ziegler Natta procatalyst in which the $TiCl_3OR$ contaminant in used mixed solvent is removed by treatment with benzoyl chloride which converts $TiCl_3OR$ to a solid addition complex. Further, the complex is separated off from the liquid phase and the liquid phase, after removal of the complex is added with fresh $TiCl_4$ and is used to treat the solid mixture containing magnesium ethoxide and the procatalyst product.

However, purification of effluent after each stage, in a multistage reaction of magnesium alkoxide with mixed solvent, is rather cumbersome and fresh solvents used each time after purification would build up solvent inventory. Additionally, $TiCl_3OR$ contaminant accumulates after each purification step and the accumulated contaminant would raise waste disposal issues.

There is a need for a process for preparation of Ziegler Natta procatalyst which overcomes the above mentioned disadvantages

SUMMARY OF THE INVENTION

The process for synthesis of Ziegler Natta procatalyst, according to the invention, involves maximum utilization of mixed solvent by its multistage treatment with magnesium alkoxide. The process of the invention also involves recycling the internal donor and successive washing of the product with used as well as recovered hexane.

OBJECTS OF THE INVENTION

An object the invention is to provide a non hazardous, low waste generating, efficient and economical process for synthesis of Ziegler Natta procatalyst.

Another object of the invention is to provide an efficient method of purifying the procatalyst by successively washing the procatalyst with used as well as recovered hexane.

Another object of the invention is to provide an active catalyst, for Ziegler Natta polymerisation of olefins, devoid of unreacted magnesium alkoxide.

A further object of the invention is to provide a process for Ziegler Natta polymerization of propylene resulting in polypropylene with high productivity.

DETAILED DESCRIPTION OF THE INVENTION

Accordingly the invention provides a process for synthesis of Ziegler Natta procatalyst involving multiple stage treatment of magnesium alkoxide with used as well as recovered mixed solvent.

In one embodiment, the invention provides a process for the synthesis of a Ziegler Natta procatalyst, the process comprising first treating magnesium alkoxide with a twice used mixed solvent of $TiCl_4$ and chloro benzene to form a first stage product, then treating the first stage product with a once used mixed solvent of $TiCl_4$ and chlorobenzene to form a second stage product and finally treating the second stage product with mixed solvent recovered by treatment of effluent from the first treatment with benzoyl chloride so as to convert contaminant of formula $TiCl_3OR$ in the effluent to an addition complex which is precipitated, filtered off and hydrolysed to recover ethyl benzoate and to form $Ti(OH)_4$ as a side product, the product after final treatment being subjected to a plurality of successive washing steps with used as well as recovered hexane.

In another embodiment, the invention provides a process for the synthesis of a Ziegler Natta procatalyst, the process comprising first treating magnesium alkoxide with a twice used mixed solvent of $TiCl_4$ and chloro benzene to form a first stage product, then treating the first stage product with a once used mixed solvent of $TiCl_4$ and chlorobenzene to form a second stage product and finally treating the second stage product with mixed solvent recovered by treatment of effluent from the first treatment with benzoyl chloride so as to convert contaminant of formula $TiCl_3OR$ in the effluent to an addition complex which is precipitated, filtered off and hydrolysed to recover ethyl benzoate and to form $Ti(OH)_4$ as a side product, the product after final treatment being subjected to a plurality of successive washing steps with used as well as recovered hexane wherein the treatment with the mixed solvent is carried out at a temperature in the range of 90-110° C., preferably in the range of 95 to 98° C.

In another embodiment, the invention provides a process for the synthesis of a Ziegler Natta procatalyst, the process comprising first treating magnesium alkoxide with a twice used mixed solvent of $TiCl_4$ and chloro benzene to form a first stage product, then treating the first stage product with a once used mixed solvent of TiCl$_4$ and chlorobenzene to form a second stage product and finally treating the second stage product with mixed solvent recovered by treatment of effluent from the first treatment with benzoyl chloride so as to convert contaminant of formula TiCl$_3$OR in the effluent to an addition complex which is precipitated, filtered off and hydrolysed to recover ethyl benzoate and to form Ti(OH)$_4$ as a side product, the product after final treatment being subjected to a plurality of successive washing steps with used as well as recovered hexane wherein molar ratio of benzoyl chloride to TiCl$_3$OR in the effluent during the treatment with benzoyl chloride is in the range of 0.8 to 1.3, preferably in the range of 0.9 to 1.0.

In another embodiment, the invention provides a process for preparation of a Ziegler Natta procatalyst wherein the procatalyst is subjected to a first washing step using thrice used hexane, a second washing step using twice used hexane and a final washing step using hexane recovered from the effluent of the first washing step.

In another embodiment, the invention provides a Ziegler Natta procatalyst prepared by first treating magnesium alkoxide with a twice used mixed solvent of TiCl$_4$ and chloro benzene to form a first stage product, then treating the first stage product with a once used mixed solvent of TiCl$_4$ and chlorobenzene to form a second stage product and finally treating the second stage product with mixed solvent recovered by treatment of effluent from the first treatment with benzoyl chloride so as to convert contaminant of formula TiCl$_3$OR in the effluent to an addition complex which is precipitated, filtered off and hydrolysed to recover ethyl benzoate and to form Ti(OH)$_4$ as a side product, the product after final treatment being subjected to a plurality of successive washing steps using hexane.

In a further embodiment, the invention provides a process of polymerization of propylene, the process comprising contacting propylene with a catalyst system comprising a procatalyst, an organoaluminium co-catalyst and 4-ethoxyalkylbenzoate as the electron donor, wherein the procatalyst is prepared according to the process of the invention.

The invention provides an economical and low waste generating route for the synthesis of procatalyst for propylene polymerisation. The synthesis is suitable for preparing both alkyl benzoate (monoester) based as well as dialkyl phthalate (diester) based catalyst systems. The synthesis is carried out in multiple stages in order to achieve maximum conversion of the reactants. Further, the procatalyst is purified by successive washings utilising used as well as recovered hexane. This ensures that the solid procatalyst after the final stage treatment has maximum purity and is devoid of magnesium alkoxide in the unreacted form. Thus, the process of the invention results in a procatalyst of good activity, apart from efficiently utilizing the reaction solvents and washing solvent.

The magnesium alkoxide reactant used for the synthesis of the procatalyst is obtained by a controlled reaction of magnesium with a mixture of alcohols. Further, the magnesium alkoxide used is a shape controlled magnesium alkoxide. During the procatalyst synthesis, magnesium alkoxide is treated with twice used and once used mixed solvent of titanium tetrachloride and chlorobenzene as well as mixed solvent recovered through benzoyl chloride treatment of impure mixed solvent (mixture of titanium tetrachloride, chlorobenzene and titaniumchloroalkoxy impurity) generated from the reaction. The repeated use and recycling of the mixed solvent reduces load on holding inventory of mixed solvent. Titaniumchloroalkoxy (TiCl$_3$OR) impurity is removed in the form of a TiCl$_4$.alkyl benzoate addition complex, which is removed from liquid phase by filtration. The solid addition complex generated from benzoyl chloride treatment is then hydrolyzed to obtain ethylbenzoate (internal donor) and titanium hydroxide. The recovered ethylbenzoate is reused for the reaction, while titanium hydroxide is obtained as a vital non-hazardous side product. Titanium hydroxide is a valuable raw material for producing titanium dioxide.

The procatalyst synthesized by the process of the invention is used for the polymerization of propylene. The polymerisation is carried in the slurry phase, gas phase as well as in the bulk phase. The selectivity control agents used for the polymerization include, but are not limited to Ethyl-4-ethoxy benzoate, Ethyl-4-propoxy benzoate, Ethyl-4-isopropoxy benzoate, Ethyl-4-Isobutoxy benzoate, Propyl-4-ethoxybenzoate, Isopropyl-4-ethoxybenzoate, Butyl-4-ethoxybenzoate and Isobutyl-4-ethoxybenzoate.

The invention is further illustrated by way of the following examples.

Example-1

Synthesis of Procatalyst 10 g of magnesium alkoxide (2-3 wt % methoxy and 70-74 wt % ethoxy derivative of magnesium) was reacted with 272 ml of titanium tetrachloride and chlorobenzene mixture (1:1 v/v) along with 4.4 ml of ethylbenzoate at 96-98° C. for 60 minutes. Magnesium alkoxide was synthesized by controlled reaction of magnesium with mixture of alcohol in presence of ethanol solvent and iodine catalyst (Mg:Ethanol:Methanol:Iodine=1:5.5-6.0:0.5-1.0:0.004-0.006) at a temperature range of 40 to 80° C.

In the first stage treatment, twice used mixed solvent obtained after the second stage treatment was treated with magnesium ethoxide. The first stage treatment resulted in a conversion of about 94 to 96%. The solid obtained after the first stage treatment was filtered off the mixed solvent. The mixed solvent (thrice used mixed solvent) obtained was subjected to benzoyl chloride treatment and the mixed solvent is recovered after the treatment. The solid product of the first stage treatment was further treated in a second stage with once used mixture of titanium tetrachloride and chlorobenzene (recovered after third stage treatment) at 96-98° C. for 30 minutes. The second stage treatment resulted in a conversion of around 97 to 98%. The solid product after the second stage treatment is filtered off the mixed solvent and further treated in a third stage with recovered mixture of mixed solvent (obtained after benzoyl chloride treatment) for 96-98° C. for 30 minutes. The third stage treatment resulted in a conversion of greater than 99.5%. Solid product after the third stage treatment is filtered off the mixed solvent and washed successively with thrice used/twice used and once used hexane and finally with recovered hexane for removal of excess titanium chloride and other impurities. The procatalyst contain 2.8-3.4 wt % titanium, 14-16 wt % ethyl benzoate and has a ethoxy content of 0.1-0.3 wt %. The solid procatalyst so obtained was used for polymerization of propylene.

Example-2

Benzoyl Chloride Treatment of Effluent 100 ml of effluent (which is a thrice used mixture of titanium tetrachloride and chlorobenzene along with titanium-chloroethoxy species) from first stage treatment and having an ethoxy content of 3.0-3.2 wt % was taken in a round bottom flask fixed with a stirrer. Benzoyl chloride was added in equimolar ratio with the ethoxy content. The reactants were mixed at 30-40° C. for 30-40 minutes. The yellow complex which is titaniumtetrachloride-ethylbenzoate adduct precipitates. The adduct was then filtered from the liquid and the filtrate was recycled for reuse.

The titaniumtetrachloride-ethylbenzoate adduct was hydrolyzed with water. Three washes of water was given to collect the organic phase. Later, organic phase was distilled to get pure ethylbenzoate which was recycled for reuse. The aqueous liquid which was acidic in nature was neutralized with caustic soda to give a white precipitate which is hydroxide of titanium that was removed by filtration.

Example-3

Polymerization Performance of Procatalyst

Dry hexane was taken in preheated moisture free stainless steel jacketed reactor fitted with magnetic stirrer. Procatalyst of example 1 along with triethylaluminium cocatalyst and ethyl-4-ethoxy benzoate were added such that cocatalyst/catalyst molar ratio of 240-250 and cocatalyst/external donor molar ratio of 4 was maintained. Mixture of catalyst, cocatalyst and donor were added in reactor and 240 ml of hydrogen was added as chain terminating agent as per requirement of melt flow index. Reactor temperature was maintained at 70° C. by heating/cooling system. Reactor pressure was maintained at 5.0-5.5 kg/cm$^2$. Polymerization reaction was carried out for 1 hr. After 1 hr of reaction, hexane was removed and polymer was collected and dried.

The slurry phase polymerization productivity of the procatalyst as compared to that of the procatalyst prepared by using fresh mixed solvent in each stage of a multistage treatment of magnesium alkoxide with mixed solvent, is displayed in table 1

From table 1, it is clear that the slurry phase polymerization productivity using the procatalyst prepared by the process of the invention is comparable with the productivity of the procatalyst prepared by using fresh solvent in each stage of the multistage mixed solvent treatment of magnesium alkoxide. Similarly, the gas phase and bulk phase polymerisation productivity using the procatalyst prepared by the process of the invention were found to be comparable with the productivity of the procatalyst prepared by using fresh solvent in each stage of the multistage mixed solvent treatment of magnesium alkoxide.

Thus, the process of the invention makes efficient use of the mixed solvent used for preparation of the procatalyst apart from avoiding the steps of purification of the mixed solvent each time it is used. The invention therefore, provides enhanced process efficiency in the catalyst preparation process leading to savings in cost and effort. By eliminating the requirement of adding solvent each time after the reaction, the process of the invention prevents build up of solvent inventory during scaling up of the synthesis. By the hydrolysis treatment of the solid waste obtained after benzoyl chloride treatment and by the recovery of the internal donor, the process of the invention avoids issues related to hazardous waste disposal and at the same time recovers a valuable reagent for the reaction.

The above description is illustrative only and is not limiting. The present invention is defined by the claims which follow and their full range of equivalents

The invention claimed is:

1. A process for the synthesis of a Ziegler Natta procatalyst, the process comprising the following steps:
   (a) first treating a mixture of magnesium alkoxides with a mixed solvent of TiCl$_4$ and chloro benzene in the presence of ethyl benzoate to form a first stage product;
   (b) treating the first stage product with a used mixed solvent of TiCl$_4$ and chlorobenzene to form a second stage product;
   (c) treating the second stage product with a recovered mixed solvent of TiCl$_4$ and chlorobenzene to form a third stage product; and
   (d) washing the third stage product with hexane comprising recycled hexane;

TABLE 1

Comparison of slurry phase polymerization productivity using procatalyst prepared by the procedure in example 1 with procatalyst prepared by treatment of magnesium alkoxide with fresh solvent during each stage of multi stage treatment.

| Experiment No | Procatalyst | Polymerization Productivity (kg PP/gmcat) | Triethyl aluminium/alkyl 4-ethoxy benzoate molar ratio | Xylene solubility (wt %) | Melt flow index of polypropylene (gm/10 min) |
|---|---|---|---|---|---|
| 1 | Procatalyst using fresh solvent in all stages | 5.7 | 4 | 3.2 | 3.1 |
| 2 | Procatalyst of example-1 | 5.6 | 4 | 3.2 | 3.1 | wherein, the mixed solvent left at the end of step (c) is used in step (b), and the solvent left at the end of step (b) is used in step (a), the recovered mixed solvent added in step (c) is obtained by treatment of effluent from step (a) with benzoyl chloride so as to convert contaminant of formula $TiCl_3OR$ in the effluent to an addition complex which is precipitated, filtered off and hydrolyzed to recover ethyl benzoate and to form $Ti(OH)_4$ as a side product, the ethyl benzoate being recycled for use in step (a) and the hexane being recycled to step (d).

2. The process as claimed in claim 1 wherein the treatment with mixed solvent is carried out at a temperature in the range of 90° C. to 110° C.

3. The process as claimed in claim 1 wherein the treatment with mixed solvent is carried out at a temperature in the range of 95° C. to 98° C.

4. The process as claimed in claim 1 wherein the molar ratio of benzoyl chloride to $TiCl_3OR$ during the benzoyl chloride treatment is in the range of 0.8 to 1.3.

5. The process as claimed in claim 4 wherein the molar ratio is in the range of 0.9 to 1.0.

6. The process as claimed in claim 1 wherein the washing includes a first washing step using thrice used hexane, a second washing step using twice used hexane and a final washing step using hexane recovered from the effluent of the first washing step.

* * * * *